April 22, 1941.  J. S. LANE  2,239,007
DISCHARGE HEAD OF SPOIL TIPPING CONVEYERS
Filed Feb. 27, 1939  3 Sheets-Sheet 1

Inventor
John S. Lane
by John E. Eastlack
Attorney

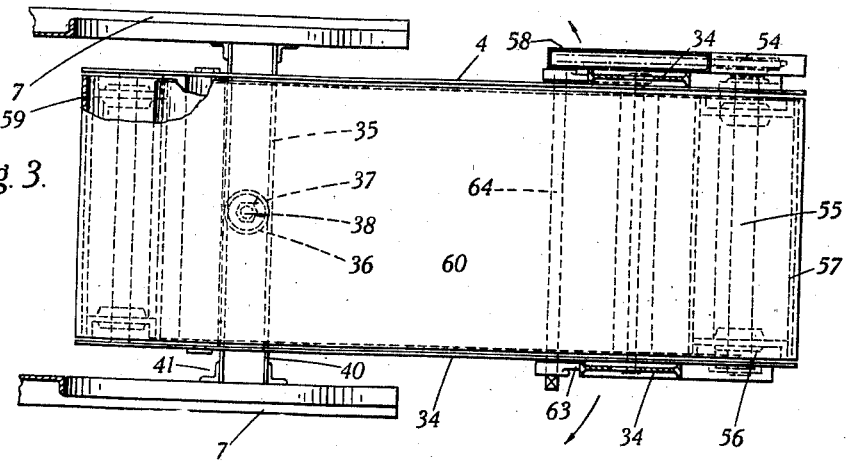

Patented Apr. 22, 1941

2,239,007

UNITED STATES PATENT OFFICE 2,239,007

DISCHARGE HEAD OF SPOIL TIPPING CONVEYERS

John Skelding Lane, Brierley Hill, England

Application February 27, 1939, Serial No. 258,841
In Great Britain May 21, 1938

8 Claims. (Cl. 198—86)

This invention relates to the discharge heads of tipping conveyers wherein an endless belt is employed for conveying and stacking loose materials such as colliery and quarry refuse, graded materials such as crushed stone and gravel, or the like, which has to be piled up to form storage banks. The improvements enable the material from the conveyer head to be distributed from side to side through an arc of 65 degrees each side of the line of direction of the main conveyer in a continuous and automatic manner so that a broad trackway is formed forward of the main conveyer and good stability is provided for the conveyer against washaways due to bad weather when resting on the pile so formed. In addition, the conveyer head is designed to be adjustable up and down in a vertical plane through an arc of plus 10 degrees to minus 30 degrees to the horizontal so that the conveyer head can be fixed to discharge in a horizonatl position when fitted to a main conveyer set at an inclination or dip to the horizontal.

According to the invention, the conveyer head includes a jib carrying a conveyer belt, so that with the travel of the latter the jib is capable of swinging laterally to effect a discharge and distribution of material.

A further feature is that the conveyer head is adapted for adjustment in a vertical plane to compensate for the inclination or dip of the main conveyer and enable discharge in a substantially horizontal direction.

In the accompanying drawings illustrating a preferred form of embodiment of the invention—

Fig. 3 is a sectional plan on line 3.3. of Fig. 1.

Figure 1:
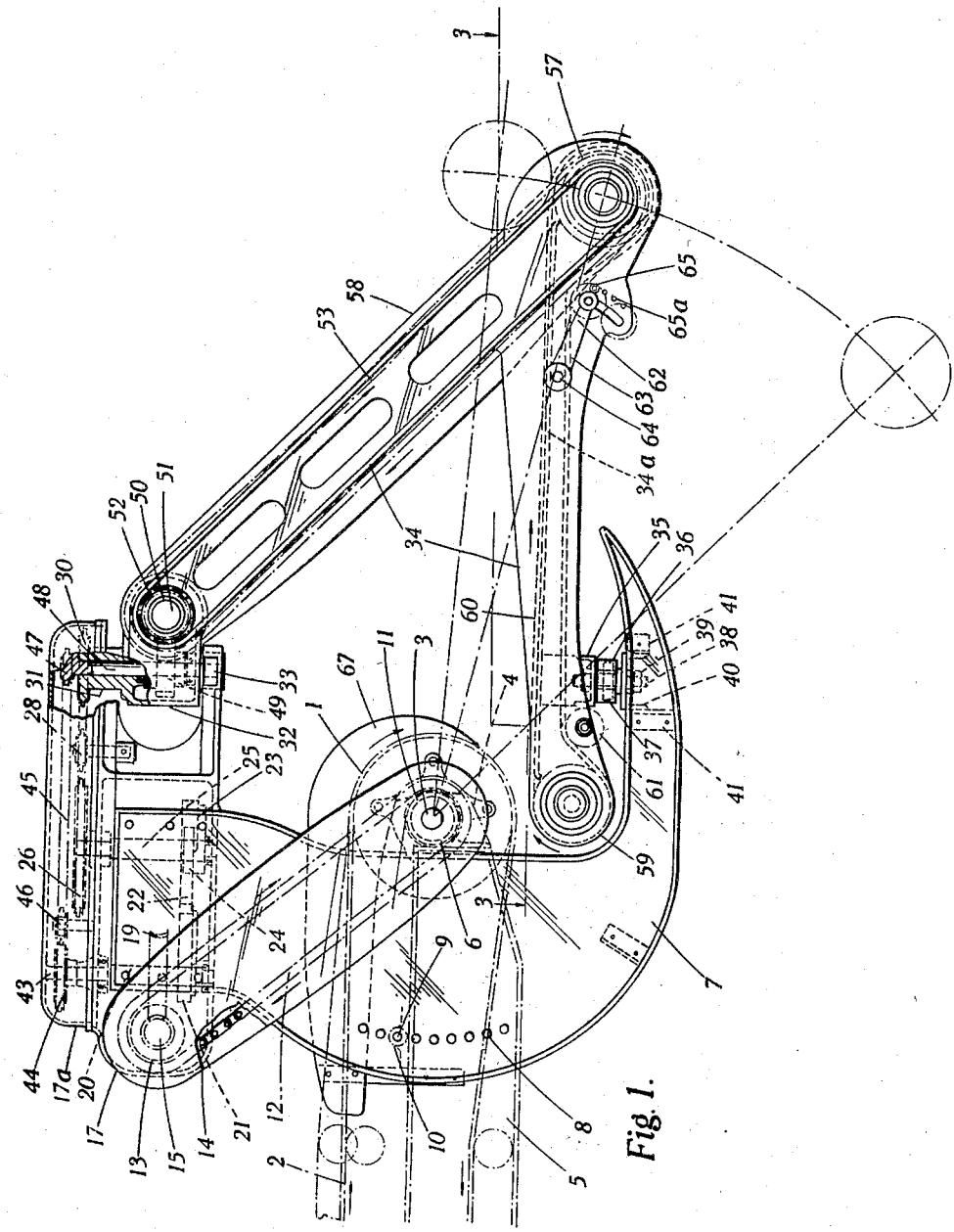
Fig. 1 is a side elevation of the conveyer discharge head as mounted upon the end of a main conveyer unit.
Figure 2:
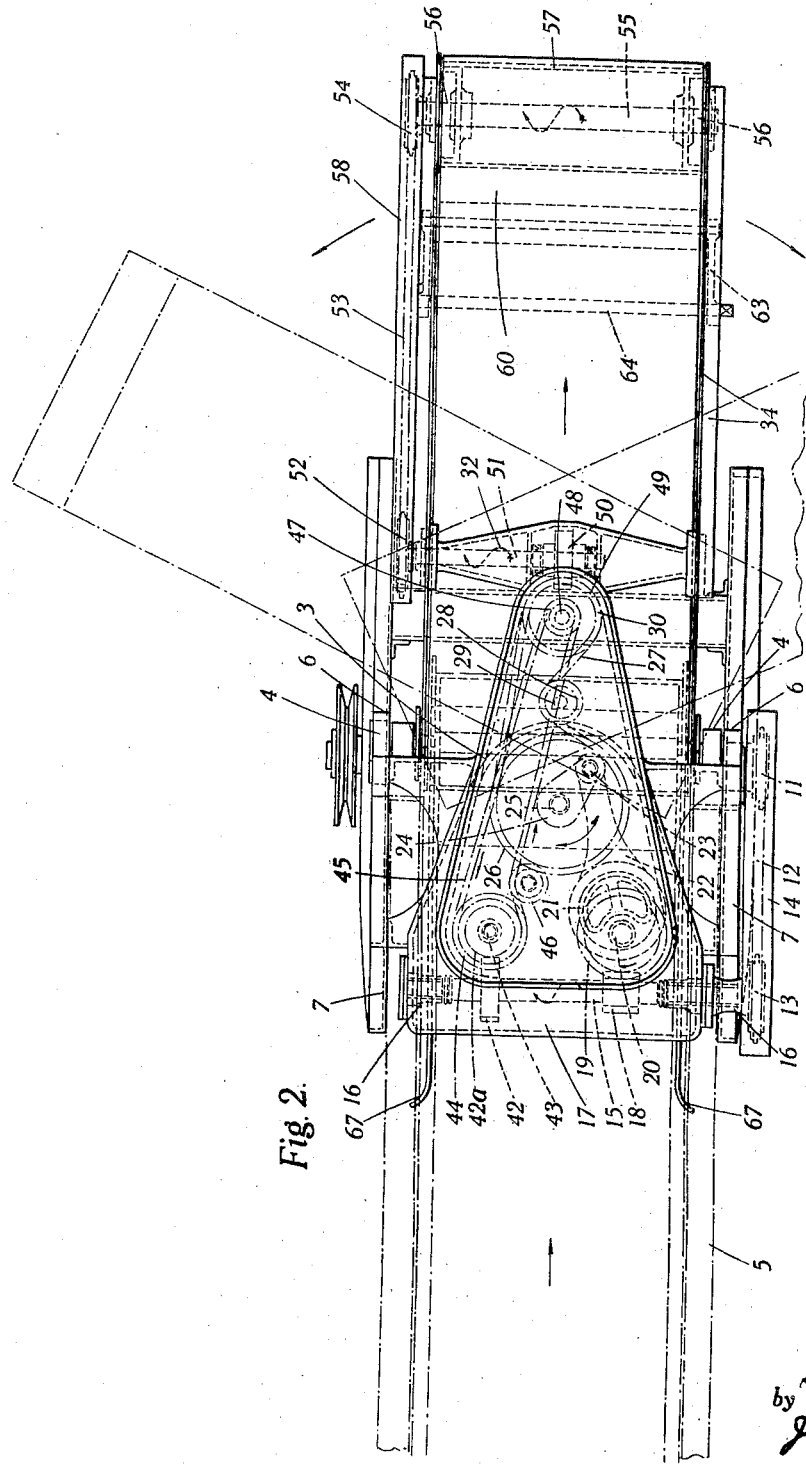
Fig. 2 is a plan.

In a constructional embodiment of the invention, the conveyer head comprises a main centre drum 1 around which the conveyer belt 2 passes, said drum being rigidly secured to a shaft 3 free to rotate in bearings 4 bolted to the main conveyer unit 5. These bearings 4 have outwardly projecting trunnions adapted to fit pivot blocks 6 which are bolted to opposite side plates or frames 7 constituting the body of the conveyer head. The side plates or frames 7 are provided with spaced holes 8 formed on an arc struck from the centre of the drum shaft, said holes 8 receiving a clamping bolt 9 passing through deadeye brackets 10 fixed to the main conveyer unit 5 whereby the conveyer head can be swung through a vertical plane to give variations of 10 degrees rise to 30 degrees dip. This enables the conveyer head to be adjusted according to the angle of the main conveyer unit 5 in order to obtain a position in which distribution is effected in a horizontal or substantially horizontal direction.

The drum shaft 3 extends externally at one side of the head side plates or frames 7 and is fitted with a chain driving sprocket 11 engaging a roller chain 12 which passes over a driven sprocket 13 enclosed in dustproof case 14. The sprocket 13 is secured to a cross countershaft 15 supported in bearings 16 bolted to a gear box 17 secured to the head side plates or frames 7.

For swinging the conveyer head from side to side through an arc of 130 degrees, that is, 65 degrees either side of a centre line of the main conveyer unit 5, suitable gear in a gear box is arranged from the said countershaft 15. This gear consists of a worm 18 upon the countershaft 15 engaging a worm wheel 19 on a vertical head shaft 20 on which is also fitted an eccentric sheave 21 having strap and link 22 connected by a pivot pin 23 to a crank 24 secured to a rocker shaft 25 extending upwards to carry chain sprocket 26 engaging with roller chain 27 over tension sprocket 28 free to rotate on eccentric pivot 29 and chain sprocket 30. The latter is formed with a vertical pivot shank 31 which is underflanged for providing or attaching to a swivel beam 32 turning about a vertical axis in suitable bearings 33 of the gear box. The conveyer head has a V angled jib frame 34 which is pivotally mounted about a vertical axis concentric with the axis of the swivel beam 32 by a bridge piece 35 fitted with a bracket 36 housing a bearing 37 for a swivel pin 38 secured by nuts 39 to a detachable cross bearer 40 fitted with cleats 41 by which it is secured to the head side plates or frames 7.

The countershaft 15 is fitted with a toothed skew gear wheel 42 meshing with a toothed skew gear wheel 42a secured to a head shaft 43 extending upwards to carry a sprocket wheel 44 engaging through a chain 45 which is tensioned by an eccentrically mounted tension sprocket 46 with a sprocket 47 secured to head shaft 48 on which is a toothed skew gear wheel 49 meshing with a skew gear wheel 50 attached to a layshaft 51. The latter is extended to pass through one end of the swivel beam 32 and is fitted with a chain sprocket driving wheel 52 engaging an inclined chain 53 on to a driven sprocket wheel 54 secured to a drum shaft 55 supported in bearings 56 of the jib 34 on which shaft is mounted a discharge head drum 57, all these parts being enclosed in a dustproof oil bath case 58.

The side frames of the jib 34 are connected by a steel tray 34a passing from side to side and from the said discharge head drum 57 to a tail drum 59 mounted in the side frames to provide a flat base to support an endless conveyer discharge belt 60. The latter passes from the discharge head drum 57 to the tail drum 59 and may be deflected over the pivot bracket 35 by a roller 61 free upon a spindle mounted in the side frames of the jib 34.

The conveyer discharge belt 60 may be held in tension by a tension roller 62 mounted on cranked levers 63 which in turn are fitted at opposite ends to a rocker shaft 64. These levers 63 have a boss 65 formed thereon with a central hole adapted to register with any particular one of a series of holes 65a in the jib side frames, through which holes a peg or bolt is threaded in order to permit adjustment in the position of the tension roller 62 and hold it securely in the adjusted position for maintaining the conveyer discharge belt 60 at proper tension.

The material from the main conveyer belt 2 is carried to fall over the main conveyer head drum 1 to the conveyer discharge belt 60 and thence to the discharge head drum 57. Adjacent the main conveyer head drum 1 are provided side deflecting plates 67 to prevent spillage of material when it is being fed to the conveyer discharge belt 60 as aforesaid.

The motive power to operate the distributor head is supplied by the main conveyer and transmitted by the main conveyer belt 2 through frictional contact with the centre head drum 1. From the head drum 1, motion is imparted through the side chain 12 and sprocket gear 13 to countershaft 15, the skew gear 19 and thence by the forward chain and sprocket gear to the swivel beam 32 whereby the conveyer jib 34 is swung from side to side. Meanwhile the associated skew gear 42 and 44, chain 45 and sprocket gear 47 operating from the countershaft 15 effect a drive of the conveyer discharge belt 60 from the tail drum 59 to the discharge head drum 57 from which the material is discharged with a spreading action due to the side-by-side swing of the jib 34.

The gear box 17 may be provided with a detachable cover 17a to retain lubricating oil and prevent ingress of water and dust to the gears.

The conveyer discharge belt 60 of the jib 34 has a linear speed of at least 10 per cent greater than the surface speed of the main conveyer belt 2 in order to prevent heaping of material at the point of fall from the main conveyer head drum 1. This increased speed has the effect of throwing the material quite clear of the discharge head drum 57, preventing choking of same and helping to make the trackway up the slope of the pile as wide as possible.

It is to be understood that the invention is not limited to the particular gears or other detail parts but may be varied or modified as required.

Having thus described my invention, what I claim is:

1. In a tipping conveyer including a main conveyer unit, a discharge head including a body pivotally connected to the advanced end of the main conveyer unit to enable adjustment of the body in a vertical arc, a jib pivotally mounted on said body so that it is adapted to swing through a horizontal arc laterally of the main conveyer unit, a discharging conveyer belt carried by the jib, and means for moving the discharging conveyer belt and automatically operating the jib in its lateral movement.

2. In a tipping conveyer including a main conveyer unit, a discharge head comprising a body mounted for pivotal adjustment in a vertical arc upon the advanced end of the main conveyer unit, a jib pivotally mounted on said body to swing through an arc in a horizontal plane, a discharging conveyer belt movable upon the jib, and operating means carried by said body and operated from the main conveyer unit for swinging the jib laterally of the main conveyer and effecting a travel of the discharging conveyer belt.

3. In a tipping conveyer including a main conveyer unit having a drum shaft, a discharge head comprising a body centred about the drum shaft, said body being formed of said frames having apertures on an arc struck from the drum shaft for adjusting the discharge head through a vertical arc, a jib pivoted on said body so as to swing through a horizontal arc, a discharging conveyer belt carried by the jib, and driving mechanism from the drum shaft operating the jib and discharging conveyer belt for effecting a discharging and spreading of the conveyed material.

4. In a tipping conveyer including a main conveyer unit having a horizontal drum shaft, a discharge head comprising a body centred about the horizontal drum shaft to enable a pivotal adjustment thereon in a vertical arc, an angularly formed jib including upper and lower members at the forward part of the head, vertically aligned upper and lower pivots on said head about which the jib is centred so as to swing through a horizontal arc to left and right of the central line of the main conveyer unit, a discharging conveyer belt carried by the lower member of the jib, and driving means from the drum shaft operating the jib and discharging conveyer belt whereby material from the main conveyer unit is discharged and spread by the discharging conveying belt.

5. In a tipping conveyer including a main conveyer unit having a drum shaft at its advanced end, a discharge head having a body including side frames pivotally connected to the drum shaft, a plurality of spaced holes on the side frames upon an arc struck from the centre of the drum shaft, a locating bracket rigidly attached to the main conveyer unit, a clamping bolt adapted to engage the locating bracket and spaced holes for fixing the discharge head in a vertically adjusted position, a vertically disposed swivel beam on said body, driving gear from the drum shaft to the swivel beam, a V jib having an upper inclined arm connected to the swivel beam and a lower arm pivotally mounted upon the side-framed body so as to swing from side to side of the main conveyer unit in a horizontal arc, a discharging conveyer belt carried by the lower arm of the jib adapted to receive material from the main conveyer unit, and driving means operated from the drum shaft for swinging the jib about the swivel beam and for moving the discharging conveyer belt.

6. In a tipping conveyer including a main conveyer unit, a discharge head comprising a body pivotally mounted at the advanced end of said unit to enable adjustment of the head through a vertical arc, a V shaped jib having a lower arm and an inclined upper arm, a vertical pivot pin fixed in the body and about which said lower arm is pivoted, a swivel beam carried by the body and connected with said upper arm, gear means operatively connected with said swivel beam for oscillating the jib from side to side of the main conveyer unit, a discharging conveyer belt carried by the jib, and means for moving said belt to effect discharge of material.

7. In a tipping conveyer including a main conveyer unit having a drum shaft at its advanced end, a discharge head comprising a body adapted to rock vertically upon said drum shaft to an adjusted position, a vertically disposed swivel beam on said body, a V-like jib having a lower arm vertically pivoted on a base part of the body and an upper inclined arm connected at its upper end to said swivel beam so as to be capable of swinging through a horizontal arc from side to side of the main conveyer unit, said beam being formed with a driven member in the upper part of the body, a second driven member having a head shaft journaled in said beam, driving means transmitted from the drum shaft to both driven members, a gear upon the journaled head shaft, a gear wheel on the inclined arm of the jib meshing with said gear, a sprocket wheel having a rigid operative connection with said gear wheel, a sprocket wheel on the lower forward end of the jib, a chain transmission on said sprocket wheels, a discharge drum on the lower end of the jib, and a discharging conveyer belt in the lower arm of the jib passing over the discharge drum.

8. In a tipping conveyer including a main conveyer unit having a drum shaft at its advanced end, a discharge head comprising a body pivoted upon the drum shaft so as to tilt through a vertical arc into adjusted position, said body having a vertically alined swivel pin and swivel beam, a V jib carried by the swivel pin and swivel beam so that it is adapted to swing through a horizontal arc laterally of the main conveyer, a head shaft journaled in the beam and having an upper sprocket thereon, a sprocket in the jib operatively connected with said upper sprocket, a jib head drum shaft having a sprocket, chain transmission from the jib sprocket to the drum shaft sprocket, a discharge head drum on the jib drum shaft, a tail drum in the lower arm of the jib, a discharging conveyer belt carried by the tail drum and head drum, and a levered tensioning roller bearing against the discharging belt for maintaining it at proper tension.

JOHN S. LANE.